United States Patent
Yada et al.

(10) Patent No.: US 10,005,204 B2
(45) Date of Patent: Jun. 26, 2018

(54) MOUNTING CONFIGURATION FOR THERMOCOUPLE TEMPERATURE DETECTOR ON KNEADER FOR HIGH VISCOSITY KNEADING MATERIAL

(71) Applicant: Suzuka Engineering Co., Ltd., Yokkaichi-shi, Mie (JP)

(72) Inventors: Yasuo Yada, Yokkaichi (JP); Tatsuo Yada, Yokkaichi (JP)

(73) Assignee: Suzuka Engineering Co., Ltd., Yokkaichi-shi (JP)

( * ) Notice: Subject to any disclaimer, the term of this patent is extended or adjusted under 35 U.S.C. 154(b) by 380 days.

(21) Appl. No.: 14/653,206

(22) PCT Filed: Nov. 26, 2013

(86) PCT No.: PCT/JP2013/081771
§ 371 (c)(1),
(2) Date: Jun. 17, 2015

(87) PCT Pub. No.: WO2014/097832
PCT Pub. Date: Jun. 26, 2014

(65) Prior Publication Data
US 2015/0330839 A1    Nov. 19, 2015

(30) Foreign Application Priority Data

Dec. 17, 2012 (JP) ................. 2012-275060

(51) Int. Cl.
*B29B 7/26* (2006.01)
*B29B 7/28* (2006.01)
(Continued)

(52) U.S. Cl.
CPC ............ *B29B 7/263* (2013.01); *B01F 7/0025* (2013.01); *B01F 7/00975* (2013.01);
(Continued)

(58) Field of Classification Search
CPC ................ B29B 7/263; B29B 7/286
(Continued)

(56) References Cited

U.S. PATENT DOCUMENTS 3,284,246 A * 11/1966 Macatician .............. G01K 1/20
136/231
4,117,926 A * 10/1978 Turner .................. G01K 1/083
136/232
(Continued)

FOREIGN PATENT DOCUMENTS

CN  201102907 Y  8/2008
CN  203455107 U  2/2014
(Continued)

OTHER PUBLICATIONS

Supplementary European Search Report for International Application No. EP 13 86 5909 dated Jun. 28, 2016.
(Continued)

*Primary Examiner* — David Sorkin
(74) *Attorney, Agent, or Firm* — Fitch, Even, Tabin & Flannery LLP

(57) ABSTRACT

There is provided a thermocouple temperature detector mounting structure for a mixing tank for which the temperature detecting end of the thermocouple temperature detector mounted on the high viscosity mixing material mixer is capable of measuring temperature in real time and for which the mechanical load applied, by the flow of the material being mixed, on the temperature detecting end is made as small as possible. A temperature sensing portion with a hemispherical tip, of a protective inner tube that accommodates a thermocouple element of a thermocouple temperature detector, is mounted on a mixing tank, for mixing a high viscosity mixing material, so as to project from the end of a protective tip that projects into the mixing tank. With the outside diameter of a projecting base section
(Continued)

of the protective tip that projects into the mixing tank being 2 to 3 times that of the protective inner tube, and with the projecting length (h) that projects into the mixing tank being the same length as the difference of the radius of the projecting base section of the protective tip and the radius of the protective inner tube, the outer circumferential face of a shoulder section of the protective tip, that is from the projecting base section of the protective tip to the site connecting to the outer circumference of the protective inner tube, is formed in a convex arcuate face that has a radius that is the difference of the radius of the projecting base section of the protective tip and the radius of the protective inner tube.

4 Claims, 4 Drawing Sheets

(51) Int. Cl.
  *B01F 15/00* (2006.01)
  *B01F 7/00* (2006.01)
  *B01F 7/04* (2006.01)
  *G01K 1/08* (2006.01)
  *G01K 1/14* (2006.01)
  *G01K 7/02* (2006.01)
  *B29B 7/18* (2006.01)

(52) U.S. Cl.
  CPC ........ *B01F 7/041* (2013.01); *B01F 15/00175* (2013.01); *B29B 7/286* (2013.01); *G01K 1/08* (2013.01); *G01K 1/14* (2013.01); *G01K 7/02* (2013.01); *B01F 2215/0049* (2013.01); *B29B 7/186* (2013.01)

(58) Field of Classification Search
  USPC .................................................. 366/76.7, 97
  See application file for complete search history.

(56) References Cited

U.S. PATENT DOCUMENTS

| | | | | |
|---|---|---|---|---|
| 4,242,906 | A | * | 1/1981 | Briscoe .................... G01K 1/08 136/232 |
| 2012/0087202 | A1 | | 4/2012 | Yada et al. |

FOREIGN PATENT DOCUMENTS

| | | | |
|---|---|---|---|
| EP | 2444217 | A1 | 4/2012 |
| JP | 1288741 | A | 11/1989 |
| JP | 4276406 | A | 10/1992 |
| JP | 2004141733 | A | 5/2004 |
| JP | 2012021817 | A | 2/2014 |

OTHER PUBLICATIONS

International Search Report, International Application No. PCT/JP2013/081771, dated Feb. 28, 2014, 2 pages.
English Translation of Written Opinion of the International Searching Authority, International Application No. PCT/JP2013/081771, dated Jun. 17, 2015, 5 pages.
Microfilm of the specification and drawings annexed to the request of Japanese Utility Model Application No. 128929/1977 (Laid-open No. 55381/1979), RKC Instrument Inc., Apr. 17, 1979, entire text; all drawings, 18 pages.

* cited by examiner

MOUNTING CONFIGURATION FOR THERMOCOUPLE TEMPERATURE DETECTOR ON KNEADER FOR HIGH VISCOSITY KNEADING MATERIAL

CROSS-REFERENCE TO RELATED APPLICATION

This application is a U.S. national phase application of International Application No. PCT/JP2013/081771, filed Nov. 26, 2013, designating the United States, which claims priority to Japanese Patent Application No. 2012-275060, filed Dec. 17, 2012, both of which are incorporated by reference herein in their entirety.

TECHNICAL FIELD

The present invention relates to a thermocouple temperature detector mounting configuration for mounting a thermocouple temperature detector that detects temperature change of a kneading material with high sensitivity on a kneading tank of a closed pressure type kneader for kneading a high viscosity kneading material such as rubber, plastic and ceramics.

BACKGROUND ART

In a known closed pressure type kneader for kneading a high viscosity kneading material such as rubber, plastic and ceramics, temperature of the kneading material which generate heat during a kneading operation is measured, for example, as disclosed in Japanese Unexamined Patent Application Publication No. 2012-21817, by providing a temperature detection end of the thermocouple temperature detector to extend from the bottom or side wall of the kneading tank for sensing the temperature of the kneading material which comes into contact with the temperature detection end. In kneaders having twin-shaft type kneading rotors which engagingly rotate in the kneading tank, lumpy or granular organic polymer materials having high viscosity is kneaded with compounding agent of inorganic substances having abrasiveness. Accordingly, a heavy rotation load is applied on the kneading material from the rotating kneading rotors of twin-shaft type, and a pressure load of the pressure lid is applied on the kneading material in order to prevent the kneading material from being uplifted in the kneading tank. The heat sensing section of the thermocouple element which is disposed on the temperature detection end of the thermocouple temperature detector is, therefore, housed in a protective tube made of a rigid material having a strength with abrasion resistance and impact resistance and is mounted on the bottom or side wall of the kneading tank.

In the thermocouple element housed in the above-described protective tube, the temperature of the kneading material which varies according to the progress of kneading is transferred to the thermocouple element via the protective tube. Accordingly, in order to allow the measured temperature to follow the temperature change of the measurement target with high sensitivity, a grounding type is effective in which the distal end of the thermocouple element is welded to the distal end of the protective tube so that the temperature of the measurement target can be sensed by the outer surface of the protective tube and electromotive force generated by the thermocouple element is transmitted to a temperature display via a conductive wire. In this case, when the strength of the protective tube for bearing a load applied from the measurement target is sufficiently increased, the heat capacity of the protective tube increases. As a consequence, the thermocouple element does not always directly sense the temperature of the kneading material and is largely controlled by the temperature of the protective tube itself, and fails to follow the temperature change of the kneading material with high sensitivity.

Further, when a rubber compound is kneaded in the kneading tank of the closed pressure type kneader, a loading rate of the kneading material including a compound agent to the kneading tank is 70 to 80% of the volume of the kneading tank to provide a flowing space for the kneading material in order to facilitate uniform distribution of the kneading material. Accordingly, the kneading material is not constantly in close contact with the detection end of the thermocouple temperature detector and is brought into contact with and moved away from the heat sensing section of the temperature detection end by engaging rotation of the twin-shaft type kneading rotors so as to dynamically moves in the flow space in the kneading tank not only in the rotation direction but also in the axis direction of the kneading rotor. As a consequence, the kneading material repeatedly comes into instantaneous contact with the temperature detection end, and the detection end fails to precisely sense the temperature of the kneading material during kneading without having a highly sensitive ability to follow the temperature.

In spite of the recent high level of industrial technology, the closed pressure type kneader for high viscosity kneading material fails to display precise temperature values on the instrument due to the above problems and in most cases, displays only the measurement value which is lower than the actual temperature. This may be one of the causes of failure of preventing the variation of plasticity, which is one of the quality properties in a rubber kneading material of a small batch size. Further, the difference between the measured temperature and the actual temperature of the kneading material sacrifices recognition of the precise terminating point of kneading by temperature and precise temperature control automatic kneading which terminates kneading by setting the upper limit temperature.

In order to overcome the above problems, in the thermocouple temperature detector disclosed in Japanese Unexamined Patent Application Publication No. 2012-21817, the shape and configuration of the protective tube which encloses the thermocouple element is improved so as to increase the sensitivity in an attempt to improve the accuracy of measured temperature. Since the protruding length of the detection end which protrudes into the kneading tank is formed large so that the thermocouple temperature detector does not lose heat sensitivity, a strength that can resist bending and breaking of the protective tube needs to be kept. As a result, the heat capacity of the protective tube increases, and the heat accumulation temperature effects to the measured temperature. This is not desirable for a parameter of kneading management.

Further, in recent years, a high speed rotation rotor is provided in large-sized close type kneaders aiming the improvement of productivity, and various performances of kneading rotors having vane are improved. As there are many cases in which a large amount of kneading material having high hardness and abrasiveness is provided, there is a need of overcoming the problem of increasing the life length of protective tube without compromising the heat sensitivity of the temperature detection end. Further, in these cases, a mechanical load applied on the temperature detection end of the thermocouple temperature detector is substantially increased, and in addition to that, the load is more frequently applied on the protruding section of the temperature detection end in the front and back direction and in the right and left direction. As a result, the life length of the existing thermocouple temperature detectors tends to be substantially reduced.

As described above, since a high speed and excessive energy is applied on the kneading material, it is inevitable that a load applied on the temperature detection end is increased compared with the conventional example. Since the temperature of the kneading material rapidly increases, the temperature needs to be precisely measured in real time. However, as the strength of protective tube is improved, the heat capacity is also increased, and this makes it difficult to perform real time measurement. Therefore, how the shape of protective tube is formed and how it is mounted on the kneading tank are important for performing precise temperature measurement while preventing bending or breaking of the detection end of the thermocouple temperature detector.

SUMMARY OF INVENTION

Technical Problem

The technical subject of the present invention is to provide a mounting configuration of a thermocouple temperature detector on a kneader for high viscosity kneading material without increasing a mechanical strength which causes the increase of heat capacity of protective tube, so that a real time temperature measurement is possible and a mechanical load applied on the temperature detection end of the thermocouple temperature detector due to the flow of the kneading material by the kneading rotor is minimized as possible by the improvement in the shape of the distal end of the protective tube itself and the mounting configuration of the protective tube on the kneading tank.

Solution to Problem

In order to solve the above problems, the present invention provides a mounting configuration of a thermocouple temperature detector for mounting the thermocouple temperature detector that measures a temperature of a high viscosity kneading material which is kneaded by rotation of a kneading rotor in a kneading tank of a closed pressure type kneader so that a heat sensing section is located in a flow area of the kneading material that flows along an inner surface of the kneading tank of the kneader, wherein the thermocouple temperature detector which is made up of two types of metal wires that generate a thermoelectromotive force is housed in a protective tube and is detachably mounted on the kneading tank, and the thermocouple temperature detector has a following configuration and is mounted on the kneading tank in the following mounting manner.

That is, the protective tube of the thermocouple temperature detector is configured such that the heat sensing section of a hemispherical shape formed at a distal end of the protective inner tube protrudes from a center on a distal end of a short tubular shaped protective chip which has a shoulder at a distal end which protrudes in a flow area of the kneading material in the kneading tank, a protrusion proximal end of the protective chip which protrudes in the kneading tank has an outer diameter which is 2 to 3 times as large as that of the protective inner tube, a protruding length which protrudes from the protrusion proximal end into the kneading tank has the same length as the difference between a radius of the protrusion proximal end of the protective chip and a radius of the protective inner tube, an outer peripheral surface of the shoulder of the protective chip which extends from the protrusion proximal end of the protective chip to a position in the protruding length which is in contact with the outer periphery of the protective inner tube is formed in a convex curvature surface having a radius which corresponds to a difference between the radius of the protrusion proximal end of the protective chip and the radius of the protective inner tube.

Further, the thermocouple element is made up of two types of metal wires, each one of ends of which is welded in a small hole formed at a tip of a protective inner tube so as to form the heat sensing section, and the other of ends of the two types of metal wires is led to the terminal board provided on the other end of the protective tube and housed in the protective tube, and the thermocouple temperature detector is mounted on the kneading tank such that the protrusion proximal end of the protective chip is located at a position along an inner surface of the kneading tank, the shoulder of the protective chip protrudes in the flow area of the kneading material so that a flow of the kneading material which flows along the inner surface of the kneading tank toward the temperature detection end is directed to a direction bypassing the protective chip, and a portion of the flow which flows toward the temperature detection end is directed to flow along the top of the heat sensing section which protrudes from the protective chip.

As described above, when the protective inner tube that houses the metal wires of the thermocouple element of the thermocouple temperature detector is thickened to increase the strength, real time temperature measurement becomes difficult due to increase of heat capacity. Accordingly, in the thermocouple temperature detector of the present invention, the wall thickness of the heat sensing section of the protective inner tube is minimized as possible and the heat sensing section is facilitated to come into contact with the flowing kneading material to increase the heat transfer speed while preventing the heat sensing section from being subject to a load due to contact with the flowing kneading material. Specifically, the heat sensing section is formed in a hemispherical shape and is associated with the protective chip so that the kneading material flows along the top surface of the protective chip, thereby reducing a force applied from the kneading material. Accordingly, it is possible to prevent bending or breaking of a detection end of the thermocouple temperature detector and minimize as possible the wall thickness of the hemispherical shape on the distal end of the protective inner tube that forms the heat sensing section.

Since the flow of the kneading material along the inner surface of the kneading tank during kneading causes the load of pressing and pulling stress in every direction around the temperature detection end to act on the temperature detection end, the protective chip located around the protective inner tube to protect the protective inner tube is formed such that the protrusion proximal end in the kneading tank has an outer diameter which is 2 to 3 times as large as that of the protective inner tube and has the wall thickness having a strength while being thermally insulated from the heat sensing section. In addition, the protruding length which protrudes from the protrusion proximal end into the kneading tank has a length which is the same length as the difference between a radius of the protrusion proximal end of the protective chip and a radius of the protective inner tube without having bending or breaking, and can be directly inserted in the inner wall of the kneading tank so as to be rigidly held, that is, the protective chip having the strength is disposed around the heat sensing section of the protective inner tube and protects the heat sensing section. Accordingly, the heat sensing section is sufficiently protected to provide the temperature detection end having a high temperature sensing precision.

Further, according to the mounting configuration of the thermocouple temperature detector having the above mounting configuration, the temperature detection end is formed such that the protrusion proximal end of the protective chip in the temperature detection end of the thermocouple temperature detector is located at a position along the inner surface of the kneading tank and the proximal end of the hemispherical shape is located on the distal surface of the protective chip with only a minimal area of the shoulder of the protective chip and the hemispherical shape of the protective inner tube being located at the center of the distal end thereof protrude into the flow area of the kneading material. Accordingly, the temperature detection end is formed to protrude into the kneading tank while preventing the effect of a heavy rotation load applied on the kneading material from the kneading rotor from being directly loaded on the temperature detection end.

That is, since the outer periphery of the shoulder of the protective chip is formed in a convex curvature that protrudes into the kneading tank, the flow of the kneading material along the inner surface of the kneading tank in any direction does not directly apply a load on the heat sensing section and is redirected at the shoulder of the protective chip formed in a convex curvature. A part of the kneading material which flows over the protective chip is directed to the distal surface of the heat sensing section which protrudes from the protective chip since there is an outer peripheral surface of a convex curvature shape at the shoulder of the protective chip. Accordingly, the distal surface of the heat sensing section is ensured to come into contact with the kneading material. However, a recess shape is formed around the contact area of the proximal end of the heat sensing section and the top surface of the protective chip and the area around the protrusion proximal end of the protective chip adjacent to the inner surface of the kneading tank, a gap is formed in the recess which is not in contact with the flowing kneading material. Even if the rubber kneading material having viscosity comes into contact with the heat sensing section and the shoulder of the protective chip, a load of the kneading material wound around the heat sensing section and the shoulder of the protective chip and pulled and pressed by the kneading rotor is reduced, thereby preventing a substantial bending force from being laterally applied.

Further, as described above, the flow of the kneading material causes the load of pressing and pulling stress in every direction around the temperature detection end to act on the temperature detection end. Even if the flow of the kneading material having a particularly large vertical direction component impacts on the mounting position of the thermocouple temperature detector in the kneading tank, the flow of the kneading material having a large vertical direction component can be distributed to the around area since the convex curvature surface of the protective chip protrudes into the kneading tank and the heat sensing section of the protective inner tube is formed into a smooth hemispherical shape around of which is protected by the protective chip. Accordingly, as described above, the shape and mounting configuration of the protective chip for preventing a heavy load from being applied on the heat sensing section by the flow of the kneading material which flows to the temperature detection end along the inner surface of the kneading tank is important for protecting the heat sensing section.

In a preferred embodiment of the mounting configuration of the thermocouple temperature detector of the present invention, the protective tube that is mounted on the kneading tank of the closed pressure type kneader includes the protective inner tube with an outer periphery except for the heat sensing section being covered by an insulating film tube having heat insulation property and two types of wires of the thermocouple element being inserted in the protective inner tube, and a sealing tube which is fitted around the protective tube with a space around the sealing tube, and the protective chip is mounted on the distal end of the sealing tube, the protective chip being formed in a cylindrical shape that protrudes from the inner surface of the kneading tank into the kneading tank, with a mounting hole being formed in the protective chip so that the heat sensing section at the distal end of the protective inner tube is inserted therethrough via the insulation film tube.

In another preferred embodiment of the present invention, the kneading tank includes a pair of rotor chambers having a cylindrical shape and connected to each other with their axis lines being horizontally arranged side by side so that the rotor chambers communicate with each other, in which a kneading rotor having a plurality of blades on the outer periphery is rotatably disposed in each rotor chamber spaced from an inner peripheral surface of the rotor chamber, and the kneading rotor is configured to downwardly rotate in the rotor chamber on a communicating side of the rotor chambers, and the temperature detection end of the thermocouple temperature detector protrudes from a top surface of a ridge wall which raises in a chevron shape at the bottom of a boundary between the rotor chambers.

Advantageous Effects of Invention

According to the mounting configuration of the thermocouple temperature detector of the present invention which is above described in detail, a real time temperature measurement can be achieved without increasing a mechanical strength of the protective tube of the thermocouple temperature detector which increases the heat capacity of the protective tube. In addition, the shape of the distal end of the protective tube itself and the mounting configuration to the kneading tank are improved so that the mechanical load applied on the temperature detection end of the thermocouple temperature detector due to flow of the kneading material by the kneading rotor can be minimized as possible.

DESCRIPTION OF EMBODIMENTS

Figure 1:
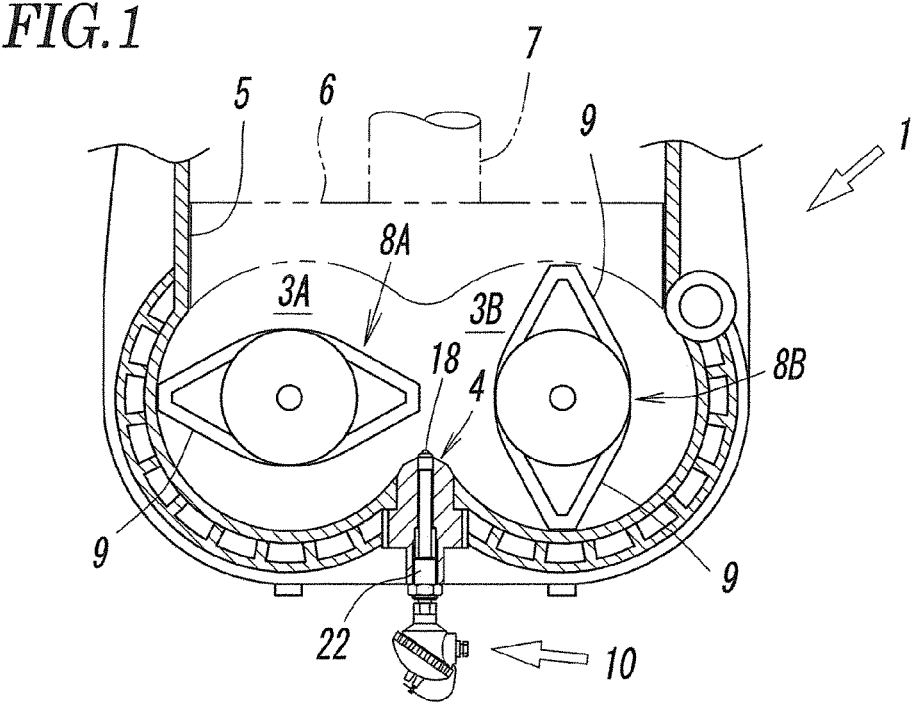
FIG. 1 is a vertical sectional view which shows an essential part of an embodiment for mounting a thermocouple temperature detector on a kneading tank of a closed pressure type kneader of tank inversion discharging type with a mounting configuration according to the present invention.

FIG. 1 shows an example of configuration for mounting a thermocouple temperature detector on a kneading tank of a relatively small-sized closed pressure type kneader for high viscosity kneading material of a tank inversion discharging type according to the present invention. The closed pressure type kneader of tank inversion discharging type is a known device which is commonly used for kneading a high viscosity kneading material such as rubber, plastic and ceramics, and the general configuration thereof will be briefly described below. The closed pressure type kneader of tank inversion discharging type is configured to discharge a kneading material by inverting the kneading tank about a rotation shaft of one of a pair of kneading rotors 8A, 8B, which will be described later, after completion of kneading in the kneading tank.

First, the kneading tank 1 shown in the figure which forms an essential part of the closed pressure type kneader is located in the lower part of the kneader body, and a pair of rotor chambers 3A, 3B having the identical cylindrical shape are disposed in the kneading tank 1 and are symmetrically connected to each other with their axis lines being arranged horizontally parallel side by side so that the rotor chambers 3A, 3B communicate with each other. A ridge wall 4 which protrudes in a chevron shape is formed on an inner bottom of the kneading tank 1 at the boundary of inner peripheral surfaces of the rotor chambers 3A, 3B, and both end faces of the rotor chambers 3A, 3B in an axis direction are closed by end walls of the tank. Further, the rotor chambers 3A, 3B have the cross section which is uniform in the axis direction.

Kneading rotors 8A, 8B for kneading a high viscosity kneading material loaded in the tank are rotatably supported by the end walls of the tank and are disposed in the rotor chambers 3A, 3B, respectively. The kneading rotors 8A, 8B are rotatably disposed spaced from the inner peripheral surfaces of the rotor chambers 3A, 3B. The kneading rotors 8A, 8B of twin-shaft type in the kneading tank 1 are provided with a plurality of spiral blades 9 on the outer peripheral. The kneading rotors 8A, 8B are connected to a driving source so that the blades 9 of the kneading rotors 8A, 8B downwardly rotate on the communicating side of the rotor chambers 3A, 3B and the blades 9 of the kneading rotors 8A, 8B also alternatively rotate. The kneading rotors 8A, 8B may rotate at the same rotating speed or at a slightly different speeds. The blades 9 are not necessarily limited to two blades.

The kneading tank 1 has an opening 5 on the top surface for loading and unloading the kneading material into and out of the tank, and the opening 5 is closed by a pressure lid 6. However, in the kneading tank 1, the pressure lid 6 may be uplifted by the kneading material due to a heavy rotation load applied on the kneading material from the two rotating shafts of the kneading rotors 8A, 8B, or a pressure in the kneading tank 1 increased with increase of temperature of the kneading material as the kneading operation proceeds. For this reason, the pressure lid 6 of the kneading tank 1 is connected to a lower end of a rod 7 of a hydraulic cylinder (which is not shown in the figure) which is disposed in the upper part of the kneader body so that the opening 5 is opened and closed by upward and downward movement of the rod 7. Accordingly, when the kneading material is loaded and unloaded into and from the kneading tank 1 via the opening on the top surface of the kneading tank 1 and the pressure lid 6 is closed, the kneading material is kneaded by the spiral blades 9 in a complicated flow direction including the rotation direction and the axis direction of the rotors by rotating the two rotors 8A, 8B while pressurizing the kneading material by using the pressure lid 6.

Figure 2:
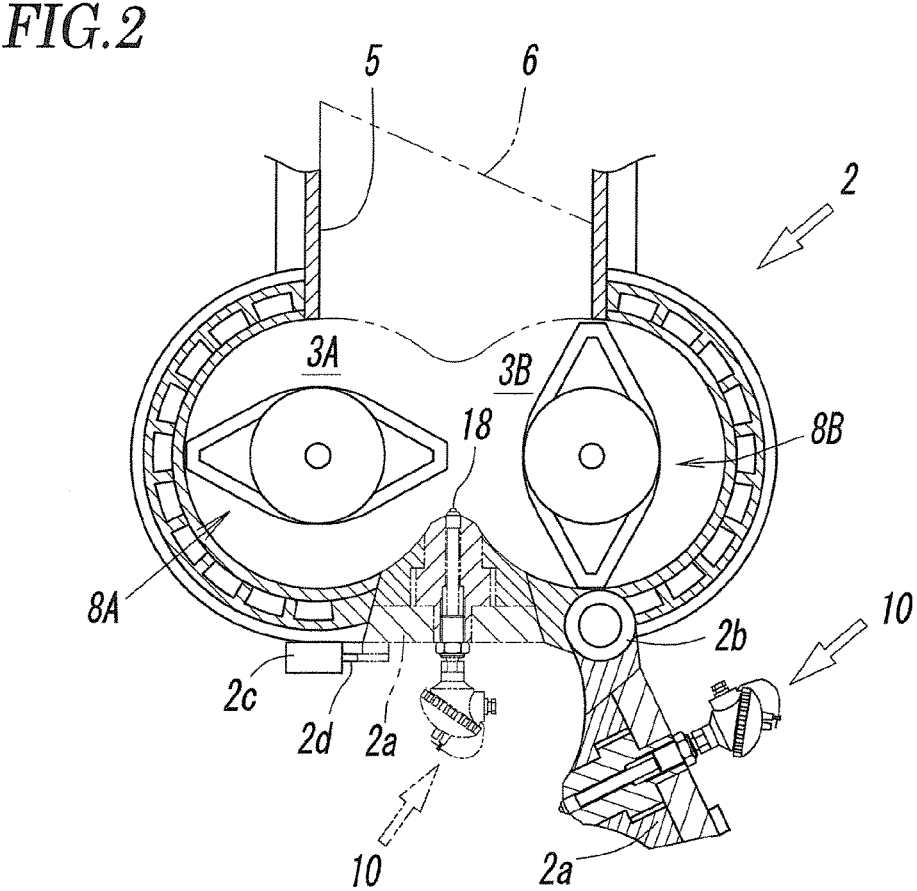
FIG. 2 is a vertical sectional view which shows an essential part of an embodiment for mounting a thermocouple temperature detector on a kneading tank of a closed pressure type kneader of bottom opening discharging type with a mounting configuration according to the present invention.

While the closed pressure type kneader of FIG. 1 is a tank inversion discharging type, FIG. 2 shows an example of configuration of mounting a thermocouple temperature detector 10 according to the present invention on the kneading tank 2 of a large-sized closed pressure type kneader of bottom opening discharging type which is suitable for mass manufacturing of tires or the like. This closed pressure type kneader of bottom opening discharging type is also a known device which is commonly used as well as the above described tank inversion discharging type kneader. Compared with the tank inversion discharging type kneader, the closed pressure type kneader of bottom opening discharging type is configured such that the bottom of the kneading tank 2 is openable by a discharge door 2a which is mounted via a hinge 2b, the discharge door 2a can be locked into a closed state by using a latch 2d which is advanced and retracted by a hydraulic cylinder 2c, and the thermocouple temperature detector 10 is mounted on the discharge door 2a in the same manner as in the case of the closed pressure type kneader of tank inversion discharging type shown in FIG. 1. In this pressurizing type kneader of bottom opening discharging type, since the temperature detector 10 is mounted on the openable discharge door 2a at the bottom of the kneading tank 2, a maintenance operation and the like of the thermocouple temperature detector 10 can be easily performed compared with the closed pressure type kneader of tank inversion discharging type.

The closed pressure type kneader of bottom opening discharging type is configured such that the discharge door 2a at the bottom of the kneading tank 2 is opened after completion of kneading by the rotors 8A, 8B of the kneading tank 2 to discharge the kneading material. Although it is partially different from the closed pressure type kneader of tank inversion discharging type of FIG. 1 in that, for example, the opening 5 is formed small so as to prevent the kneading material from being discharged from the top surface, the remaining configuration and effect are the same as those of the closed pressure type kneader of tank inversion discharging type shown in FIG. 1 and FIGS. 3 to 6. Therefore, their description is incorporated herein, and main corresponding parts are denoted by the same reference numbers and the detailed description thereof are omitted.

Figure 3:
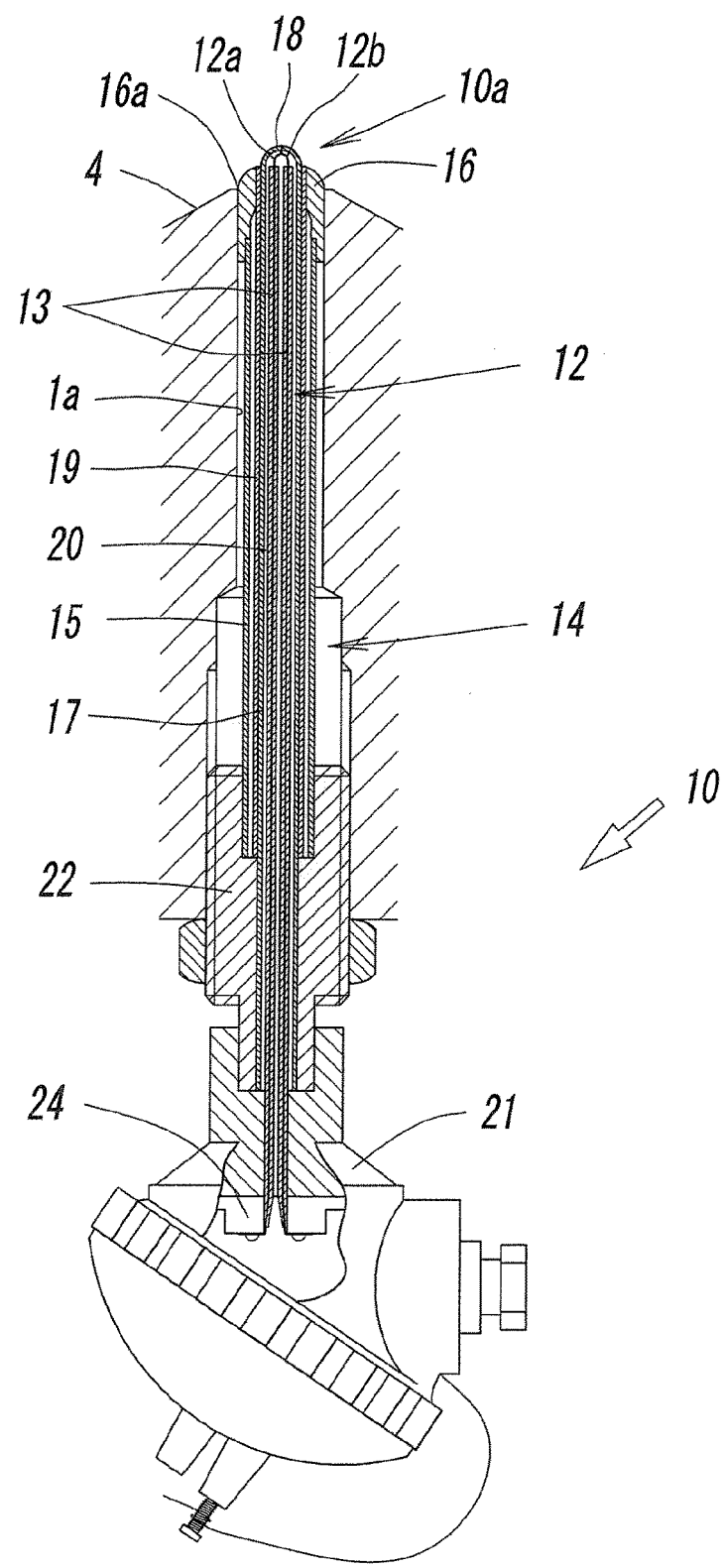
FIG. 3 is a vertical sectional view which shows a configuration example of the thermocouple temperature detector.
Figure 4:
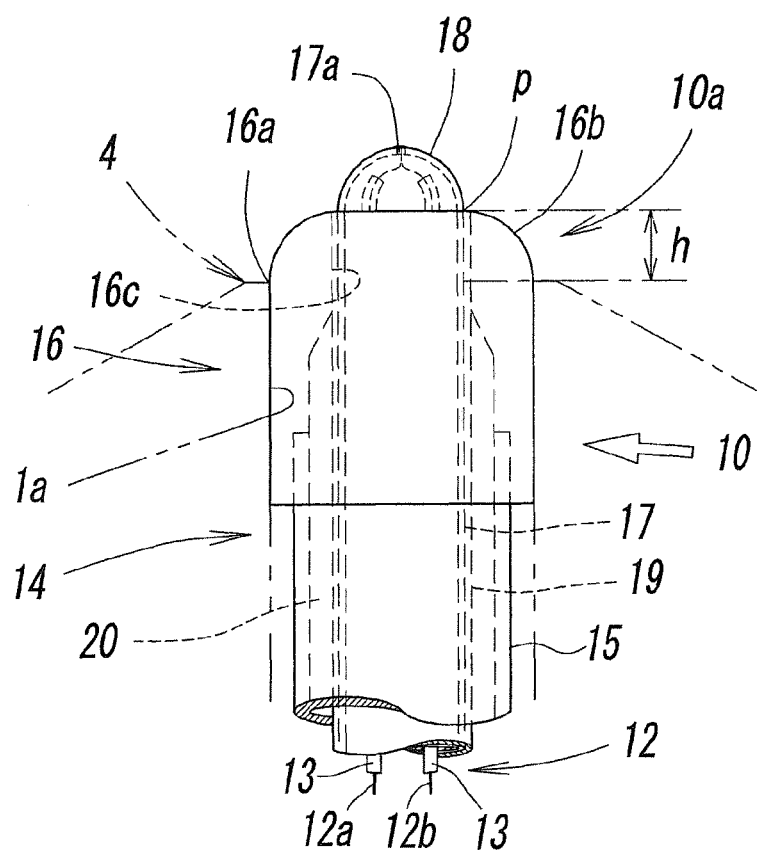
FIG. 4 is a partial enlarged sectional view which shows a configuration of an essential part of the thermocouple temperature detector.

In the closed pressure type kneader, the thermocouple temperature detector 10 that measures the temperature of the high viscosity kneading material which is kneaded by rotation of the kneading rotors 8A, 8B in real time as possible has a configuration as described below with reference to FIGS. 3 and 4. The thermocouple temperature detector 10 is detachably attached on the kneading tank 1 so that a temperature detection end 10a of the thermocouple temperature detector 10 is located in a flowing area of the kneading material which flows along the inner wall surface of the kneading tank 1. In the example shown in FIGS. 1 and 2, the thermocouple temperature detector 10 is threadingly inserted from the lower part on the outer surface of the kneading tank 1 to be removably attached thereto so that the temperature detection end 10*a* of the thermocouple temperature detector 10 extends from the top surface of the ridge wall 4 formed at the boundary of the inner peripheral surfaces of the rotor chambers 3A, 3B.

Brief description of a kneading operation of the closed type kneader for high viscosity kneading material will be described by an example of kneading a high viscosity rubber compound. Usually, approximately 75% of a space volume of the kneading tank 1 subtracted by the volume of two rotating kneading rotors 8A, 8B is a net volume for kneading the kneading material. When a rubber compound of 100% of the space volume is loaded, the kneading material is wound around the two rotating kneading rotors 8A, 8B and rotates in a cylindrical shape during kneading, and the loaded kneading material is not distributed. When a suitable amount of the material is loaded, kneading operation starts with crushing of polymer (raw material rubber) into pieces in the powder material. Then, as the powder material is kneaded into the polymer and small granules are generated, the temperature of the kneading material increases, and accordingly, the rubber kneading material becomes viscous and a large lump of the kneading material is generated in the kneading tank 1. This increase a load applied on the temperature detection end 10*a* which protrudes into the kneading tank 1. Since a space volume of 20 to 30% is left in the kneading tank 1, the kneading material freely moves across the tank at high speed in response to rotation of the kneading rotors 8A, 8B. Only when the kneading material comes into contact with the temperature detection end 10*a* (a heat sensing section 18 which will be described later) of the thermocouple temperature detector 10, the temperature detector 10 instantaneously senses the temperature and outputs them as the time course temperature data.

Next, a configuration of the thermocouple temperature detector 10 used in the closed type kneader will be described in detail. The thermocouple temperature detector 10 includes a thermocouple element 12 made up of two types of metal wires 12*a*, 12*b* which generate a thermoelectromotive force due to Seebeck effect, and the thermocouple element 12 is housed in a protective tube 14 for protection. The protective tube 14 includes a sealing tube 15 which forms a sheath of the thermocouple temperature detector 10, and a protective inner tube 17 in which the metal wires 12*a*, 12*b* which form the thermocouple element 12 are inserted. The distal end of the sealing tube 15 is connected to a protective chip 16, which will be described later, and the outer periphery of the protective inner tube 17 except for a heat sensing section 18 formed in a hemispherical shape at the distal end is covered by a heat insulating film tube 19 having heat insulating property and electric insulating property.

In the thermocouple temperature detector 10, the thermocouple element 12 having a temperature detection function is welded to each one of the ends of the metal wires 12*a*, 12*b* which generate a thermoelectromotive force. The welded section is inserted in a small hole 17*a* formed at the tip end of the hemispherical protective inner tube 17 and is welded at the distal end of the protective inner tube 17 by build-up welding from the outside of the protective inner tube 17 so as to be fixed to the protective inner tube 17 in a grounded state to form the heat sensing section 18. Then, two types of metal wires 12*a*, 12*b* are each covered by an insulation cover 13 that prevents electrical contact and are inserted in the protective inner tube 17. The other of the ends of the metal wires 12*a*, 12*b* are led to a terminal board 24 and connected thereto. The terminal board 24 is disposed in a detector body 21 and is provided via a mounting fixture 22 for mounting on the kneading tank 1 at the other end of the protective tube 14. The metal wires 12*a*, 12*b* of the thermocouple element 12 connected to the terminal board 24 are led out to the outside of the detector body 21 via conductive wires and are connected to various instrument so that the temperature of the kneading material is displayed as the value of temperature based on the thermoelectromotive force or is used as a control signal.

As described above, the protective tube 14 includes the sealing tube 15 and the protective inner tube 17 in which the thermocouple element 12 is inserted. The sealing tube 15 is fitted around the protective inner tube 17 with a space 20 being interposed between the sealing tube 15 and the outer periphery of the protective inner tube 17 for heat insulation so as to be provided as a sheath of the protective tube 14. The protective chip 16 of a cylindrical shape is fixed to the distal end of the protective tube 14 so as to protrude from the inner wall surface of the kneading tank 1 into the flow area of the kneading material in the kneading tank 1. A mounting hole 16*c* is formed in the protective chip 16 so that the distal end of the protective inner tube 17 is inserted through the mounting hole 16*c* via the heat insulation film tube 19, and the heat sensing section 18 formed in a hemispherical shape at the distal end of the protective inner tube 17 protrudes from the distal end of the protective chip 16 through the mounting hole 16*c*.

In the configuration for mounting the thermocouple temperature detector 10 on the kneading tank 1, a detector mounting hole 1*a* is formed at a mounting position of the temperature detector 10 in the kneading tank 1 so that the protective chip 16 is closely fitted in the detector mounting hole 1*a* and a portion of the protective chip 16 from a protrusion proximal end 16*a* which is located on the inner wall surface of the kneading tank 1 to the temperature detection end 10*a* at the distal end protrudes in the flow area of the kneading material. The length of the temperature detection end 10*a* protruding into the kneading tank 1 is determined by threading the mounting fixture 22 into the detector mounting hole 1*a* and fixed thereto along with the "tank body". The mounting configuration of the thermocouple temperature detector 10 is not limited to the above described threading insertion. A flange may be formed on the mounting fixture 22 or the like and fixes it to the outer surface of the kneading tank by using bolts.

The protective chip 16 of the thermocouple temperature detector 10 which is mounted on the kneading tank 1 has an outer diameter at the protrusion proximal end 16*a* which is at the proximal end protruding from the inner wall surface of the kneading tank 1 which is 2 to 3 times as large as that of the protective inner tube 17. As shown in FIG. 4, a protruding length h which protrudes from the protrusion proximal end 16*a* into the kneading tank 1 has the same length as the difference between the radius of the outer circumference of the protrusion proximal end 16*a* of the protective chip 16 and the radius of the protective inner tube 17 at the protrusion proximal end 16*a*, and, the outer peripheral surface of a shoulder 16*b* of the protective chip 16 which extends from the protrusion proximal end 16*a* of the protective chip 16 to a position p in the protruding length h which is in contact with the outer periphery of the protective inner tube 17 is formed in a convex curvature surface having a radius which corresponds to the difference between the radius of the protrusion proximal end 16a of the protective chip 16 and the radius of the protective inner tube 17.

Figure 5:
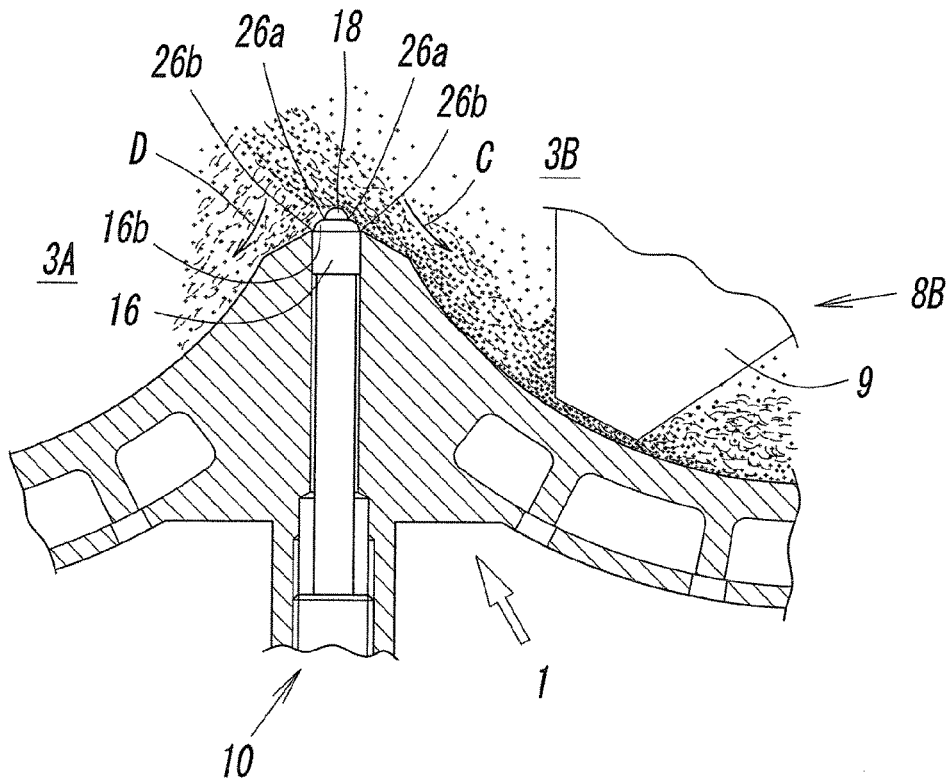
FIG. 5 is a schematic explanatory view of an essential part of a cross section at the same position as that of FIG. 1 and FIG. 3 which show kneading of a kneading material in a kneading tank on which the thermocouple temperature detector is mounted.
Figure 6:
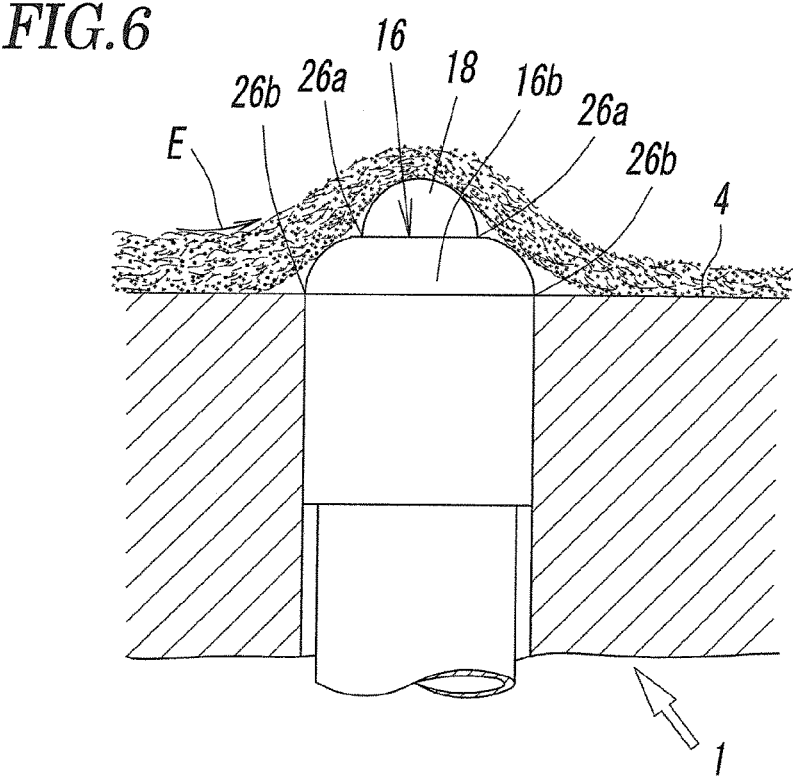
FIG. 6 is a schematic explanatory view of an essential part of a cross section along a ridge wall between rotor chambers which shows kneading of a kneading material in a kneading tank on which the thermocouple temperature detector is mounted.

When the protective chip 16 of the thermocouple temperature detector 10 is positioned as described above, the temperature detection end 10a of the protective chip 16 protrudes into the flow area of the kneading material as shown in FIGS. 5 and 6. As will be described below with reference to FIGS. 5 and 6, the load applied on the temperature detection end 10a and the heat sensing section 18 of the protective inner tube 17 from the kneading material can be substantially small due to the presence of the temperature detection end 10a and the related configuration of the heat sensing section 18 of the protective inner tube 17 to the temperature detection end 10a.

Particularly, since there is the heat insulation film tube 19 between the protective chip 16 and the protective inner tube 17, the heat capacity seldom effects to the real-time temperature detection. Accordingly, it is easy to provide strength to bear the load applied from the kneading material by thickening the wall. As a result, the protective chip 16 is effective for reducing the load applied on the heat sensing section 18 of the protective inner tube 17 from the kneading material. Further, when the protective tube 14 is mounted on the kneading tank 1, a ventilation hole is formed on the sealing tube 15 so that the gap 20 between the protective inner tube 17 and the sealing tube 15 communicates with the outside to prevent the heat stored in the kneading tank 1 from being transferred to the temperature detection end 10a. The heat insulation film tube 19 is provided not only for preventing heat transfer, but also for preventing leakage of a weak electromotive force supplied from the thermocouple element 12 through the protective tube 14 into the kneading tank 1 and for protecting it from the adverse effect by electricity of the kneading tank 1.

Since the kneading material freely moves across the flow space in the kneading tank by rotation of the kneading rotors 8A, 8B of the kneading tank 1 and a substantial impact load is repeatedly applied on the temperature detection end 10a, the load of pressing and pulling stress in every direction around the temperature detection end 10a acts on the temperature detection end 10a which protrudes into the kneading tank 1. The flow of the kneading material which flows toward the position of the temperature detection end 10a is roughly divided into two types of flow in terms of the direction of the load applied on the temperature detection end 10a, that is, a flow which mainly flows to the temperature detection end 10a so as to press it downward (in the axis direction of the temperature detector 10) as shown in FIGS. 1 and 5 (first flow), and a flow which mainly flows along the inner surface of the kneading tank 1 at the position of the temperature detection end 10a and is largely inclined to the axis direction of the temperature detector 10 so as to flow from one side of the temperature detection end 10a to the other side as shown in FIGS. 5 and 6 (second flow).

The first flow is, for example, a flow by which the kneading material located at the center portion of the kneading tank 1 in which the rotor chambers 3A, 3B communicate to each other is directed to the temperature detection end 10a in the kneading tank 1 at the center portion by downward rotation of the blade 9 of either of the kneading rotors 8A, 8B, or a flow by which the kneading material which follows the blade 9 downwardly presses the temperature detection end 10a when the blade 9 rotates under the ridge wall 4 of the kneading tank 1. Further, the second flow is generated by a flow of the kneading material along the inner surface of the rotor chambers 3A, 3B which occurs mainly by rotation of the kneading material in the rotor chambers 3A, 3B in response to rotation of the kneading rotors 8A, 8B. It is necessary to minimize the load applied on the heat sensing section 18 from the above flow, and this need is accommodated by combination shaped of the hemispherical shape of the distal end of the heat sensing section 18 and the protective chip 16.

In general, the first flow and the second flow in a combined state come into contact with the surface of the temperature detection end 10a while passing by the temperature detection end 10a. On this assumption, the temperature detection end 10a needs to have a sufficient strength to bear the load applied by the combined flow. Since the kneading material does not impact on the temperature detection end 10a with an inertia force in the initial phase of kneading in which crushed pieces of the kneading material are mixed, the load applied on the heat sensing section 18 from the kneading material is not particularly large. On the other hand, in the phase in which the kneading material becomes viscous and a large lump of the kneading material is generated in the kneading tank 1, the load of pulling stress due to sticking and winding of the kneading material is frequently applied on the temperature detection end 10a which extends into the kneading tank 1 starts to increase as the kneading rotors 8A, 8B rotate. Accordingly, for the temperature detection end 10a, reduction of the load applied on the temperature detection end 10a in a direction orthogonal to the axis direction is mainly considered in this phase.

The load due to the first and second flow of the kneading material which is applied on the temperature detection end 10a will be described below in detail. First, when the flow of the kneading material flowing to the temperature detection end 10a in the kneading tank 1 is the first flow, the flow mainly impacts on the front side of the temperature detection end 10a, that is, the protective chip 16 and the heat sensing section 18 at the center of the protective chip 16. Since the shoulder 16b of the protective chip 16 has the protruding length h which protrudes into the kneading tank 1 which is the same as the thickness in the radial direction and the outer peripheral surface which is formed as a convex curvature surface which protrudes into the kneading tank 1, and the heat sensing section 18 of the protective inner tube 17 is held by the protective chip 16 at the periphery and has a protruding section formed in a hemispherical shape, the flow of the kneading material is distributed to the surrounding area along the outer surface of the heat sensing section 18 of a hemispherical shape and the shoulder 16b of the protective chip 16 of a convex curvature surface. As a result, even if the first flow impacts on the temperature detection end 10a in the axis direction, the flow is distributed to the surrounding area while pressing down the heat sensing section 18 of a hemispherical shape. Accordingly, the heat sensing section 18 may only have a strength necessary to bear the distribution of the flow, and is not subject to a severe damage.

On the other hand, when the flow of the kneading material flowing to the temperature detection end 10a in the kneading tank 1 is the second flow, the flow presses against the lateral side of the temperature detection end 10a while flowing along the inner surface of the kneading tank 1 and may cause the heat sensing section 18 to be inclined or broken, and this flow may be the main cause of damaging the temperature detection end 10a. More specifically, the second flow is a case where the kneading material having flowing viscosity is pulled in the arrow C direction while following the rotation of the blade 9 of the kneading rotor 8B in the kneading tank 1 as schematically shown in FIG. 5, or where the kneading material having increased flowing viscosity flows along the ridge wall 4 between the rotor chambers 3A, 3B as shown in FIG. 6. As a matter of course, the kneading material located at the center portion in which the rotor chambers 3A, 3B communicate with each other flows to the position of the temperature detection end 10a on the ridge wall 4 in the kneading tank 1 at the center portion by downward rotation of the blade 9 of either of the kneading rotors 8A, 8B. In this flow of the kneading material, when a component of the second flow is large, it is substantially the same as the case of FIG. 5 in which the kneading material follows the blade 9, and, when the kneading material mainly flows downward to the temperature detection end 10a, the flow is the first flow.

In the configuration of the temperature detection end 10a for performing a sufficient strength to bear the load applied by the second flow, the heat sensing section 18 having a hemispherical shape formed on the distal end of the protective inner tube 17 protrudes from the distal end of the protective chip 16, the protruding length h protrudes from the protrusion proximal end 16a of the protective chip 16 into the kneading tank 1 has the same length as the difference between the radius of the protrusion proximal end 16a of the protective chip and the protective inner tube 17, and the outer peripheral surface of the shoulder 16b of the protective chip 16 is formed in a convex curvature surface having a radius which corresponds to the difference between the radius of the protrusion proximal end 16a of the protective chip 16 and the protective inner tube 17. Since the kneading material having viscosity which flows toward the temperature detection end 10a in the state shown in FIG. 5 follows the blade 9 of the kneading rotor 8B and is pulled in the arrow C direction, it reaches the heat sensing section 18. However, as described below, the flow of the kneading material flows along the top surface of the heat sensing section 18 and is basically directed in the direction which substantially bypasses the temperature detection end 10a which includes the heat sensing section 18. As a result, a large flowing load of the kneading material is not applied on the heat sensing section 18 of the protective inner tube 17.

More specifically, since the outer periphery of the shoulder 16b of the protective chip 16 is formed in a ring shape of a smooth convex curvature surface and holds the protective inner tube 17 and has a high strength, a portion of the kneading material flowing in the arrow C direction which is directed to the protective chip 16 becomes a bypassing flow by flowing around or over the protective chip 16.

Particularly, on the side of the temperature detection end 10a which faces the rotor chamber 3A, since there is a flow of the kneading material in the arrow D which follows the blade 9 of the kneading rotor 8A in the rotor chamber 3A, the kneading material tends to be pulled by the flow and flows into the rotor chamber 3A. As a result, the flow in the direction of the arrow C which applies a large pressing force on the side of the heat sensing section 18 which faces the rotor chamber 3A is not generated, and the flow is rather similar to the first flow. Although there may be a bypassing flow in the direction of the arrow C which flows in the direction that flows over the protective chip 16, the flow flows along the top surface of the heat sensing section 18 of the protective chip 16 and then flows along the inner surface of the rotor chamber 3B.

As described above, the flow of the kneading material which is pulled by rotation of the kneading rotor 8B and flows in the direction of the arrow C of FIG. 5 does not always flow along the top surface of the heat sensing section 18 after flowing over the protective chip 16. Although the flow may intermittently impact on the temperature detection end 10a from a space formed in the kneading tank 1 on a temporary basis, such a flow has little risk of applying a large load on the heat sensing section 18. Usually, as shown in FIG. 5, the normal flow of the kneading material flows along and over the top surface of the hemispherical heat sensing section 18, and then, again comes into contact with the outer peripheral surface of the shoulder 16b of the protective chip 16 formed in a convex curvature surface. Further, the kneading material which flows over the outer peripheral surface having a convex curvature surface comes into contact with the inner surface of the kneading tank 1 having raised outer peripheral surface, the kneading material does not flow into the recess 26a between the heat sensing section 18 and the outer peripheral surface of a convex curvature surface of the shoulder 16b of the protective chip 16 and a recess 26b between the outer peripheral surface of the protective chip 16 and the inner surface of the kneading tank 1 at which the protective chip 16 raises, that is, lumps of the kneading material do not stick on the heat sensing section 18 or the temperature detection end 10a and do not apply a large load by being in contact with the heat sensing section 18 or the temperature detection end 10a.

Similarly, in the kneading material which flows in the direction shown in FIG. 6, the kneading material which normally flows in the arrow E direction along the ridge wall 4 becomes a bypassing flow which flows around or over the protective chip 16 at a point which is in contact with the outer peripheral surface of a convex curvature surface of a ring-shaped shoulder 16b of the protective chip 16. The kneading material flowing in the direction over the protective chip 16 reaches the heat sensing section 18 along the outer periphery of the shoulder 16b of the convex curvature surface, but does not flow into the recess 26a between the outer peripheral surface of a convex curvature surface of the protective chip 16 and the heat sensing section 18. After flowing along and over the top surface of the heat sensing section 18, it again comes into contact with the outer peripheral surface of the shoulder of the protective chip 16 of the convex curvature surface. The kneading material which flows over the outer peripheral surface of the convex curvature surface comes into contact with the inner surface of the kneading tank 1 at which the outer peripheral surface raises, and does not flow into the recess 26a between the outer peripheral surface of a convex curvature surface of the protective chip 16 and the heat sensing section 18 or the recess 26b between the outer peripheral surface of the protective chip 16 and the inner surface of the kneading tank 1 at which the protective chip 16 raises, that is, lumps of the kneading material are wound around or sticks on the heat sensing section 18 due to the presence of the outer peripheral surface of the convex curvature surface of the shoulder 16b of the protective chip 16 and do not apply a large flowing load by being in contact with the heat sensing section 18.

As described above, the kneading material which is kneaded by the kneading rotors 8A, 8B in the kneading tank and is directed to the temperature detection end 10a as the second flow comes into strong contact with the outer peripheral surface of the convex curvature surface of the shoulder 16b of the protective chip 16, but is forced to bypass by the convex curvature surface to move along the heat sensing section 18 of the hemispherical shape at the distal end of the protective inner tube 17, and does not apply a load on the protective inner tube 17 in a direction of inclining the protective inner tube 17, and is ensured to come into contact with the heat sensing section 18 so that the instantaneous temperature can be detected. Further, since the protective chip 16 itself also has the outer peripheral surface formed in a convex curvature surface and only a distal portion of the protrusion from proximal end 16a protrudes in the kneading tank 1, the flowing load applied on the protective chip 16 can be reduced. Even if the flowing load from the kneading material of some extent is applied, the stress load is reduced by the flow of the kneading material being appropriately guided.

The invention claimed is:

1. A combination kneader and thermocouple temperature detector detachably mounted to the kneader, the combination comprising:
    a closed pressure type kneader for kneading high viscosity kneading material, which is kneaded by rotation of a kneading rotor in a kneading tank of the closed pressure type kneader;
    a thermocouple temperature detector comprising a thermocouple element, a protective tube, a protective inner tube disposed at least partially in the protective tube, and a tubular shaped protective chip;
        the thermocouple element comprising two types of metal wires that generate a thermoelectromotive force and being housed in the protective tube,
        one end of the two types of metal wires being welded into a small hole formed at a tip of the protective inner tube in the protective tube so as to form a heat sensing section, and the other end of the two types of metal wires being led to a terminal board provided on the other end of the protective tube and housed in the protective tube, so that the heat sensing section is located in a flow area of the kneading material that flows along an inner surface of the kneading tank of the kneader,
        the protective tube being configured such that the heat sensing section defines a hemispherical shape formed at a distal end of the protective inner tube and protrudes from a distal end of the protective chip,
        the protective chip having:
            a shoulder at the distal end a protruding into the flow area of the kneading material in the kneading tank,
            a protrusion proximal end protruding into the kneading tank and having an outer diameter which two to three times as large as that of the protective inner tube,
            a protruding length from the protrusion proximal end into the kneading tank having the same length as the difference between a radius of the protrusion proximal end of the protective chip and a radius of the protective inner tube,
            an outer peripheral surface of the shoulder of the protective chip extending from the protrusion proximal end of the protective chip to a position in contact with the outer periphery of the protective inner tube and being defined by a convex curvature having a radius which corresponds to a difference between the radius of the protrusion proximal end of the protective chip and the radius of the protective inner tube, and
        wherein the thermocouple temperature detector is mounted on the kneading tank such that the protrusion proximal end of the protective chip is located at a position along an inner surface of the kneading tank, the shoulder of the protective chip protrudes into the flow area of the kneading material so that a flow of the kneading material which flows along the inner surface of the kneading tank is directed to a direction bypassing the protective chip and along the top of the heat sensing section which protrudes from the protective chip.

2. The combination kneader and thermocouple temperature detector detachably mounted to the kneader according to claim 1, the combination further comprising:
    an insulating film tube having heat insulation properties and a sealing tube wherein:
    an outer periphery of the protective inner tube, except for the heat sensing section, is covered by the insulating film tube, the two types of wires of the thermocouple element being inserted in the protective inner tube,
    the sealing tube is fitted around the protective inner tube with a space around the protective inner tube, and
    the protective chip is mounted on a distal end of the sealing tube, the protective chip being formed in a cylindrical shape that protrudes from the inner surface of the kneading tank into the kneading tank, with a mounting hole being formed in the protective chip so that the heat sensing section at the distal end of the protective inner tube is inserted therethrough via the insulating film tube.

3. The combination kneader and thermocouple temperature detector detachably mounted to the kneader according to claim 1, wherein the combination further comprises:
    a pair of rotor chambers in the kneading tank, each having a cylindrical shape and connected to each other with their axis lines being horizontally arranged side by side so that the rotor chambers communicate with each other, and
    a kneading rotor having a plurality of blades on an outer periphery rotatably disposed in each rotor chamber and spaced from an inner peripheral surface of each rotor chamber,
    wherein each kneading rotor is configured to downwardly rotate in each rotor chamber on a communicating side of each rotor chamber, and
    wherein a temperature detection end of the thermocouple temperature detector protrudes from a top surface of a ridge wall defining a chevron shape at the bottom of a boundary between the rotor chambers.

4. The combination kneader and thermocouple temperature detector detachably mounted to the kneader according to claim 2, wherein the combination further comprises:
    a pair of rotor chambers in the kneading tank, each having a cylindrical shape and connected to each other with their axis lines being horizontally arranged side by side so that the rotor chambers communicate with each other, and
    a kneading rotor having a plurality of blades on an outer periphery rotatably disposed in each rotor chamber and spaced from an inner peripheral surface of each rotor chamber,
    wherein each kneading rotor is configured to downwardly rotate in each rotor chamber on a communicating side of each rotor chamber, and
    wherein a temperature detection end of the thermocouple temperature detector protrudes from a top surface of a ridge wall defining a chevron shape at the bottom of a boundary between the rotor chambers.

* * * * *